UNITED STATES PATENT OFFICE.

FERDINAND GERHARD WIECHMANN, OF NEW YORK, N. Y.

TREATING SUGAR OR OTHER SOLUTIONS.

SPECIFICATION forming part of Letters Patent No. 553,974, dated February 4, 1896.

Application filed May 20, 1895. Serial No. 549,991. (No specimens.)

*To all whom it may concern:*

Be it known that I, FERDINAND GERHARD WIECHMANN, a citizen of the United States, residing at the city, county, and State of New York, have invented a Process of Treating Sugar and other Solutions, of which the following is a specification.

My invention relates to a process of treating sugar and other solutions whereby the impurities contained therein are removed.

Generally my improved process consists in subjecting the solutions from which the impurities are to be removed to the action of a filtering agent and simultaneously or successively to the action of chemicals, which latter entering into combination in the solution form an insoluble precipitate, which precipitate acts in the nature of a filtering agent and mechanically tends to separate the impurities.

I will now describe my improved process as employed by me in the treatment of sugar solutions.

The sugar solution to be purified may be of any desired degree of density up to 1.415. To such a solution there is added the filtering agent—*i. e.*, diatomaceous earth from 0.01 per cent. to 2.5 per cent. of the weight of the "dry substance" contained in the solution. The amount of diatomaceous earth used will depend upon the nature and character of the solution to be purified—*i. e.*, the amount of impurities contained, which can easily be determined by any one skilled in the art to which this invention belongs and by the employment of means commonly known. The diatomaceous earth employed is preferably such as has been washed or burned—in other words, such as has had its mechanical impurities removed. I do not limit myself, however, to the use of treated diatomaceous earth, as the earth in the condition in which it comes from the mines may be employed. The diatomaceous earth acts as a filtering agent in two ways: first, when mixed with the solution and in settling, by attracting and carrying down with it the mechanically-suspended impurities in the solution, and, secondly, by forming a layer or deposit on the filter-bags or filter-cloths, whereby there is secured a more perfect mechanical filtration than can be obtained by any other known filtering agent.

Simultaneously with the introduction of the diatomaceous earth, prior thereto or following its introduction, I add to the solution under treatment any salt of phosphoric acid which is soluble in water and which may be precipitated by the use of suitable chemicals as an insoluble compound. Such salt of phosphoric acid may be employed either in dry form, as a paste, or in solution.

I do not in anywise limit myself to any special salt of phosphoric acid, provided that the salt used is one whose acid radical is $PO_4$, which is soluble in water, and which, when brought in contact with another chemical—as, for instance, calcic hydrate—forms an insoluble precipitate. Of such salts may be mentioned orthophosphoric acid and monocalcic phosphate. The quantity of the salt which I may use will vary from 0.01 per cent. to 2.0 per cent. of the weight of the dry substance contained originally in the solution under treatment. The amount of the salt so used will also depend upon the nature and character of the solution—that is to say, the greater the amount of contained impurities and the more viscous their nature the greater the amount of the diatomaceous earth as well as of the chemicals which may be required. This can only be determined by actual experiment with limited quantities of the material to be defecated. After adding the phosphoric salt I add to the solution an alkaline earth, such as lime (calcic hydrate) in any form desired, preferably in that known as the "milk of lime," and in quantity sufficient to combine chemically with and precipitate the salt or salts of phosphoric acid employed.

The quantity of lime used is in accordance with the chemical conditions exhibited in the following formula:

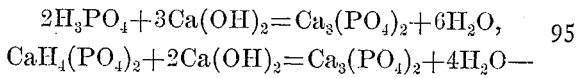

that is to say, for every one hundred and ninety-six parts by weight of orthophosphoric acid two hundred and twenty-two parts by weight of calcic hydrate, and for every two hundred and thirty-four parts by weight of monocalcic phosphate one hundred and forty-eight parts by weight of calcic hydrate are required. In place of using lime as a chemical agent to combine with the salt of phosphoric acid to form an insoluble precipitate, I may use any other chemical—such, for instance, as salts of barium, aluminium, or iron. Calcic hydrate is, however, preferable for use with sugar solution. The other chemicals mentioned may be used for the filtration of other solutions where it is desired to form an insoluble precipitate.

During the process of adding the diatomaceous earth, the phosphoric salt, and any of the other chemicals mentioned, the solution is kept preferably in motion—in other words, agitated—by stirring or otherwise.

Instead of using the diatomaceous earth, phosphoric salt, and any of the other chemicals in the order stated, I may reverse their order or introduce them in any order without materially affecting the results. Preferably it is best to proceed as first stated.

The action of the chemical reagents employed is as follows: The calcic hydrate or other alkaline earth, or any of the other chemicals previously mentioned, combine chemically with the soluble salts of phosphoric acid to form an insoluble compound, which in the case where calcic hydrate is employed consists principally of tri-calcic phosphate. This compound as it forms envelops and imprisons the mechanically-suspended impurities existing in the solution, and in the case where the chemical substances are introduced subsequently to the introduction of the diatomaceous earth also takes up portions of the diatomaceous earth and together form the precipitate which later is deposited upon the filter-cloths or filter-bags.

After completing the operations indicated the solution is transmitted through the usual filter-bags, presses, or similar devices, for the purpose of removing all mechanically-suspended particles. This completes the process.

Instead of using diatomaceous earth alone, I may, prior to its introduction into the solution to be treated, combine it with a salt of phosphoric acid of the character indicated, and in such a manner as to produce a dry preparation which may be conveniently packed or shipped and subsequently used in the process. It will be understood that when this dry preparation is employed the step hereinbefore set forth of treating the solution with an uncombined salt of phosphoric acid should be omitted, the salt of phosphoric acid in the dry preparation taking its place.

Filtration may be accomplished by the employment of diatomaceous earth alone or by the employment of the chemical reagents specified. In the latter case, however, unless considerable quantities of the chemical reagents are employed, the precipitation of the suspended impurities is not complete, and in consequence the filtrate runs more or less cloudy, instead of being perfectly clear, and where considerable quantities of the reagents are used the precipitate of which the impurities form a part readily clogs the interspaces in the filter bags or cloths and thus retards and in many cases eventually completely stops filtration.

It may be stated as the great and important mission of the diatomaceous earth in the process described, to overcome these two difficulties. By virtue of its characteristic and peculiar porous structure, the diatomaceous earth picks up and holds all mechanically-suspended impurities, even the most minute, and, furthermore, when forming a part of the precipitate produced by the chemicals specified, it gives to this precipitate a porous structure which permits the treated solution to flow absolutely clear and more rapidly and for a longer time from the filter-bags, thus effecting great saving and increased working capacity.

I wish it understood that I do not limit my improved process to the treatment of sugar-liquors, as it may be used for the filtration of water, oils, spirituous and other solutions containing mechanically-suspended impurities.

I claim as my invention—

1. The herein-described process of defecating and purifying sugar and other solutions, which consists in subjecting said solutions to the action of a filtering agent having the general characteristics of diatomaceous earth, then to the action of a salt of which $PO_4$ is the acid radical and which is soluble in water, and a chemical of the character indicated which will combine with said salt to form an insoluble precipitate, and finally removing the mechanically-suspended particles from said solution.

2. The herein-described process of defecating and purifying sugar and other solutions, which consists in subjecting said solutions to the action of a filtering agent having the general characteristics of diatomaceous earth, a salt of which $PO_4$ is the acid radical soluble in water and an alkaline earth, such as calcic hydrate.

3. A step in the process of treating sugar and other solutions, which consists in introducing into said solutions a dry preparation composed of diatomaceous earth, and a salt of which $PO_4$ is the acid radical and which is soluble in water.

In testimony whereof I affix my signature in the presence of two witnesses.

FERDINAND GERHARD WIECHMANN.

Witnesses:
PAUL N. TURNER,
GEO. H. BENJAMIN.